US010348692B2

(12) United States Patent
Savolainen

(10) Patent No.: US 10,348,692 B2
(45) Date of Patent: Jul. 9, 2019

(54) METHOD AND APPARATUS FOR ANONYMOUS ACCESS AND CONTROL OF A SERVICE NODE

(71) Applicant: Nokia Technologies Oy, Espoo (FI)

(72) Inventor: Teemu Ilmari Savolainen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/510,990

(22) PCT Filed: Sep. 16, 2014

(86) PCT No.: PCT/IB2014/064567
§ 371 (c)(1),
(2) Date: Mar. 13, 2017

(87) PCT Pub. No.: WO2016/042359
PCT Pub. Date: Mar. 24, 2016

(65) Prior Publication Data
US 2017/0279775 A1 Sep. 28, 2017

(51) Int. Cl.
*H04W 4/00* (2018.01)
*H04L 29/06* (2006.01)
(Continued)

(52) U.S. Cl.
CPC ...... *H04L 63/0421* (2013.01); *H04L 63/0281* (2013.01); *H04L 67/12* (2013.01);
(Continued)

(58) Field of Classification Search
None
See application file for complete search history.

(56) References Cited

U.S. PATENT DOCUMENTS 7,093,286 B1 * 8/2006 King .................. H04L 63/0281
380/270
7,865,943 B2 * 1/2011 Hayler ................ G06F 12/1466
713/150
(Continued)

FOREIGN PATENT DOCUMENTS

CN  101582887 B  11/2009
CN  102196431 A   9/2011
(Continued)

OTHER PUBLICATIONS

International Search Report and Written Opinion received for corresponding Patent Cooperation Treaty Application No. PCT/IB2014/064567, dated Sep. 16, 2014, 5 pages.
(Continued)

*Primary Examiner* — Anh Vu H Ly
(74) *Attorney, Agent, or Firm* — Mintz, Levin, Cohn, Ferris, Glovsky and Popeo, P.C.

(57) ABSTRACT

A method, apparatus and computer program product are provided for anonymous access and control of a service node. In the context of a method, the method includes causing the transmission of a privacy proxy URI in response to the privacy proxy URI request, and establishing a privacy connection with user equipment in response to receiving a request to connect including the URI. The URI is a portion of the privacy enabled URI based at least in part on the privacy proxy URI. The method further includes causing the transmission of a request message to a service node in response to receiving a request message from the user equipment through the privacy connection.

21 Claims, 4 Drawing Sheets

(51) Int. Cl.
  *H04W 4/38* (2018.01)
  *H04W 12/02* (2009.01)
  *H04L 29/08* (2006.01)
  *H04W 4/70* (2018.01)

(52) U.S. Cl.
  CPC ............. *H04W 4/38* (2018.02); *H04W 12/02* (2013.01); *H04W 4/70* (2018.02)

(56) References Cited

U.S. PATENT DOCUMENTS

| | | | | |
|---|---|---|---|---|
| 8,566,928 | B2* | 10/2013 | Dagon | H04L 29/12066 726/22 |
| 2003/0181205 | A1* | 9/2003 | Yiu | H04W 12/02 455/426.1 |
| 2005/0015499 | A1* | 1/2005 | Mayer | H04L 29/06 709/228 |
| 2007/0124294 | A1* | 5/2007 | Sun | G06F 17/30864 370/352 |
| 2007/0133517 | A1* | 6/2007 | Miller | H04L 65/1069 370/352 |
| 2007/0234416 | A1* | 10/2007 | Matsuoka | H04L 12/2803 726/12 |
| 2008/0235385 | A1 | 9/2008 | Li | |
| 2010/0110110 | A1* | 5/2010 | Wu | G09G 3/3688 345/690 |
| 2012/0084831 | A1 | 4/2012 | Hu et al. | |
| 2012/0137213 | A1* | 5/2012 | Hayler | G06F 12/1466 715/239 |
| 2013/0067023 | A1* | 3/2013 | Joy | H04L 63/1458 709/217 |
| 2013/0212215 | A1* | 8/2013 | Ukkola | H04L 67/02 709/217 |
| 2014/0053085 | A1* | 2/2014 | Stephure | G06F 16/954 715/753 |
| 2014/0067902 | A1 | 3/2014 | Wang et al. | |
| 2014/0162544 | A1* | 6/2014 | Edge | H04W 8/005 455/3.01 |
| 2014/0259100 | A1 | 11/2014 | Li | |
| 2014/0372624 | A1* | 12/2014 | Wang | H04L 65/60 709/231 |
| 2015/0067819 | A1* | 3/2015 | Shribman | H04L 67/06 726/12 |
| 2015/0170072 | A1* | 6/2015 | Grant | G06Q 10/067 705/7.36 |
| 2015/0207838 | A1* | 7/2015 | Gabin | H04L 65/4084 709/219 |
| 2015/0304384 | A1* | 10/2015 | Lee | H04L 67/02 709/203 |
| 2016/0330172 | A1* | 11/2016 | Muttik | H04L 63/0281 370/389 |

FOREIGN PATENT DOCUMENTS

| | | |
|---|---|---|
| CN | 102891856 A | 1/2013 |
| CN | 103044349 A | 5/2013 |
| CN | 103077349 A | 5/2013 |
| CN | 103095691 A | 5/2013 |
| EP | 2341479 A1 | 7/2011 |
| JP | 2005236939 A | 9/2005 |
| KR | 20140091826 A | 7/2014 |
| WO | 2008036947 A2 | 3/2008 |
| WO | 2013/089697 A2 | 6/2013 |
| WO | 2013/186061 A1 | 12/2013 |
| WO | 2015/088481 A1 | 6/2015 |
| WO | 2015/107388 A1 | 7/2015 |
| WO | 2015/144971 A1 | 10/2015 |

OTHER PUBLICATIONS

Shelby et al., "Core Resource Directory Draft-Ietf-Core-Resource-Directory-01", Internet Draft, Ericsson, Dec. 11, 2013, pp. 1-29.
Dingledine et al., "Tor: The Second-Generation Onion Router", Proceedings of the 13th conference on USENIX Security Symposium, vol. 13, Aug. 9-13, 2004, 17 pages.
Chaabane et al., "Digging into Anonymous Traffic: A Deep Analysis of the Tor Anonymizing Network", 4th International Conference on Network and System Security, Sep. 1-3, 2010, pp. 167-174.
Nowlan et al., "Reducing Latency in Tor Circuits with Unordered Delivery", 3rd USENIX Workshop on Free and Open Communications on the Internet (FOCI '13), 2013, 7 pages.
Shelby et al., "The Constrained Application Protocol (CoAP)", RFC 7252, Internet Engineering Task Force (IETF), Jun. 2014, pp. 1-97.
Savolainen et al., "Coap Over Websockets Draft-Savolainen-Core-Coap-Websockets-02", CoRE Working Group, Internet Draft, Apr. 10, 2014, pp. 1-18.
Bormann., "A TCP Transport for Coap Draft-Bormann-Core-Coap-Tcp-00", CoRE, Jul. 30, 2013, pp. 1-7.
Silverajan et al., "Coap Communication with Alternative Transports Draft-Silverajan-Core-Coap-Alternative-Transports-05", CoRE Working Group, Jun. 27, 2014, pp. 1-19.
Castellani et al., "Guidelines for HTTP-Coap Mapping Implementations Draft-Ietf-Core-Http-Mapping-04", CoRE Working Group, Jul. 4, 2014, pp. 1-29.
"Web Proxy Auto-Discovery Protocol", Wikipedia, Retrieved on May 16, 2018, Webpage available at : https://en.wikipedia.org/wiki/Web_Proxy_Auto-Discovery_Protocol.
Zhou et al., "Preserving Sensor Location Privacy in Internet of Things", Fourth International Conference on Computational and Information Sciences (ICCIS), Aug. 17-19, 2012, pp. 856-859.
Cooper et al., "Privacy Considerations for Ipv6 Address Generation Mechanisms Draft-Ielf-6man-Ipv6-Address-Generation-Privacy-01. Txt", Network Working Group, Feb. 14, 2014, pp. 1-17.
"Tor: Hidden Service Protocol", Wayback machine, Retrieved on May 23, 2018, Webpage available at : https://webarchive.org/web/20140816080952/torproject.org/docs/hidden-services.html.
Huang et al., "User Interactive Internet of Things Privacy Preserved Access Control", International Conference for Internet Technology and Secured Transactions, Dec. 10-12, 2012, pp. 597-602.
Elkhodr et al., "A Contextual-adaptive Location Disclosure Agent for General Devices in the Internet of Things", IEEE 38th Conference on Local Computer Networks Workshops (LCN Workshops), Oct. 21-24, 2013, pp. 848-855.
Extended European Search Report received for corresponding European Patent Application No. 14901904.4, dated Apr. 17, 2018, 7 pages.
Marshall et al., "SIP Extensions for Caller Identity and Privacy", SIP Working Group, Nov. 21, 2001, 30 pages.
Office action received for corresponding Japanese Patent Application No. 2017-514452, dated May 22, 2018, 2 pages of office action and 3 pages of translation available.

* cited by examiner

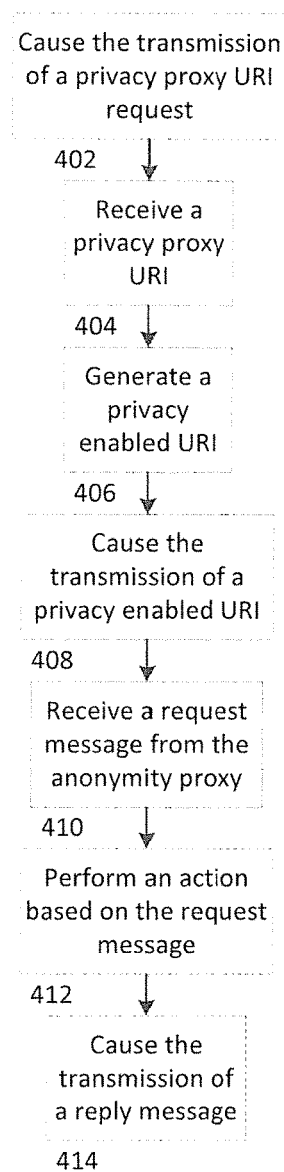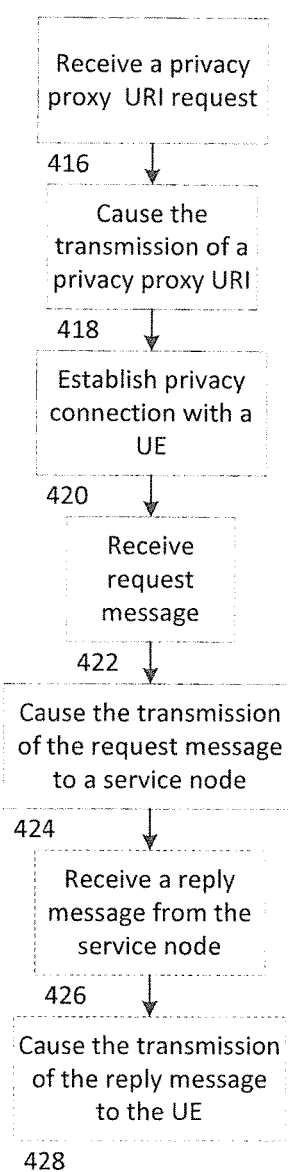
Figure 4A
Figure 4B

METHOD AND APPARATUS FOR ANONYMOUS ACCESS AND CONTROL OF A SERVICE NODE

RELATED APPLICATION

This application was originally filed as Patent Cooperation Treaty Application No. PCT/IB2014/064567 filed Sep. 16, 2014.

TECHNOLOGICAL FIELD

An example embodiment of the present invention relates to access and control of service nodes and, more particularly, to a method, apparatus and computer program product for anonymous access and control of a service node.

BACKGROUND

In the Internet of Things (IoT) significant effort has been invested for service nodes advertising availability for communications, for example, by transmitting an advertisement of uniform resource locations (URLs) on which they may be reached. However, there is a lack of anonymity for users, user equipment (UE), and the service nodes.

BRIEF SUMMARY

A method, apparatus and computer program product are provided in accordance with an example embodiment for anonymous access and control of a service node. In an example embodiment, a method is provided that includes causing the transmission of a privacy proxy uniform resource identifier (URI) in response to the privacy proxy URI request, and establishing a privacy connection with an user equipment in response to receiving a request to connect including a URI. The URI is a portion of the privacy enabled URI based at least in part on the privacy proxy URI. The method further includes causing the transmission of a request message to a service node in response to receiving a request message from the user equipment through the privacy connection.

In some example embodiments of the method, the transmission of the privacy proxy uniform identifier is caused in response to receiving a privacy proxy uniform resource identifier request from the service node. In an example embodiment of the method, the privacy enabled URI is further based on the servicing node URI. In some example embodiments, the method also includes sending a reply message to the UE in response to receiving a reply message from the servicing node. In an example embodiment of the method, the privacy connection is an onion routing protocol (Tor).

In some example embodiments of the method, the request messages are received and transmitted using a constrained application protocol (CoAP). In an example embodiment the method also includes connecting to a privacy network in response to receiving the privacy proxy URI request.

In another example embodiment, a method is provided including receiving a privacy proxy uniform resource identifier (URI) from an anonymity proxy, generating a privacy enabled URI based at least in part on the privacy proxy URI, causing the transmission of the privacy enabled URI, and receiving a request message from the anonymity proxy. The anonymity proxy transmits the request message in response to receiving a request message from a user equipment based on the privacy enabled URI through a privacy connection.

In an example embodiment, the method also includes performing an action based on the request message. In some example embodiments, the method also includes causing the transmission of a reply message. The reply message is received by the anonymity proxy which transmits the reply message to the user equipment through the privacy connection. In an example embodiment of the method, the request messages or reply messages are received and transmitted using a constrained application protocol (CoAP).

In a further example embodiment, an apparatus is provided including at least one processor and at least one memory including computer program code, the at least one memory and computer program code configured to, with the processor, cause the apparatus to at least cause the transmission of a privacy proxy URI, establish a privacy connection with user equipment in response to receiving a request to connect including a URI. The URI is a portion of the privacy enabled URI based at least in part on the privacy proxy URI. The at least one memory and computer program code area also configured to, with the processor, cause the apparatus to cause the transmission of a request message to a service node in response to receiving a request message from the user equipment through the privacy connection.

In some example embodiments of the apparatus, the transmission of the privacy proxy uniform identifier is caused in response to receiving a privacy proxy uniform resource identifier request from the service node. In an example embodiment of the apparatus the privacy enabled URI is further based on the servicing node URI. In some example embodiments, the at least one memory and the computer program code, of the apparatus, are further configured to send a reply message to the UE in response to receiving a reply message from the servicing node. In an example embodiment of the apparatus, the privacy connection is an onion routing protocol (Tor).

In some example embodiments of the apparatus, the request messages are received and transmitted using a constrained application protocol (CoAP). In an example embodiment, the at least one memory and the computer program code are further configured to connect to a privacy network in response to receiving the privacy proxy URI request.

In still a further example embodiment, an apparatus is provided including at least one processor and at least one memory including computer program code, the at least one memory and computer program code configured to, with the processor, cause the apparatus to at least receive a privacy proxy uniform resource identifier (URI) from an anonymity proxy, generate a privacy enabled URI based at least in part on the privacy proxy URI, cause the transmission of the privacy enabled URI, and receive a request message from the anonymity proxy. The anonymity proxy transmits the request message in response to receiving a request message from a user equipment based on the privacy enabled URI through a privacy connection.

In some example embodiments of the apparatus, the receiving a privacy proxy uniform resource identifier from an anonymity proxy is in response to transmitting a privacy proxy uniform resource identifier request. In an example embodiment of the apparatus, the at least one memory and the computer program code are further configured to perform an action based on the request message. In some example embodiments of the apparatus, the at least one memory and the computer program code are further configured to cause the transmission of a reply message. The reply message is received by the anonymity proxy which transmits the reply message to the user equipment through the privacy connection. In an example embodiment of the apparatus, the request messages or reply messages are received and transmitted using a constrained application protocol (CoAP).

In yet another example embodiment a computer program product is provided including at least one non-transitory computer-readable storage medium having computer-executable program code portions stored therein, the computer-executable program code portions comprising program code instructions configured to cause the transmission of a privacy proxy URI in response to the privacy proxy URI request, and establish a privacy connection with user equipment in response to receiving a request to connect including a URI. The URI is a portion of the privacy enabled URI based at least in part on the privacy proxy URI. The computer-executable program code portions further comprise program code instructions configured to cause the transmission of a request message to a service node in response to receiving a request message from the user equipment through the privacy connection.

In some example embodiments of the apparatus, the transmission of the privacy proxy uniform identifier is caused in response to receiving a privacy proxy uniform resource identifier request from the service node. In an example embodiment of the computer program product, the privacy enabled URI is further based on the servicing node URI. In some example embodiments of the computer program product, the computer-executable program code portions further comprise program code instructions configured to send a reply message to the UE in response to receiving a reply message from the servicing node. In an example embodiment of the computer program product the privacy connection is an onion routing protocol (Tor).

In an example embodiment of the computer program product the request messages are received and transmitted using a constrained application protocol (CoAP). In some example embodiments of the computer program product, the computer-executable program code portions further comprise program code instructions configured to connect to a privacy network in response to receiving the privacy proxy URI request.

In another example embodiment a computer program product is provided including at least one non-transitory computer-readable storage medium having computer-executable program code portions stored therein, the computer-executable program code portions comprising program code instructions configured to receive a privacy proxy uniform resource identifier (URI) from an anonymity proxy, generate a privacy enabled URI based at least in part on the privacy proxy URI, cause the transmission of the privacy enabled URI, and receive a request message from the anonymity proxy. The anonymity proxy transmits the request message in response to receiving a request message from a user equipment based on the privacy enabled URI through a privacy connection.

In some example embodiments of the computer program product, the receiving a privacy proxy uniform resource identifier from an anonymity proxy is in response to transmitting a privacy proxy uniform resource identifier request. In an example embodiment of the computer program product the computer-executable program code portions further comprise program code instructions configured to perform an action based on the request message. In some example embodiments of the computer program product, the computer-executable program code portions further comprise program code instructions configured to cause the transmission of a reply message. The reply message is received by the anonymity proxy which transmits the reply message to the user equipment through the privacy connection. In an example embodiment, of the computer program product, the request messages or reply messages are received and transmitted using a constrained application protocol (CoAP).

In yet a further example embodiment, an apparatus is provided including means for causing the transmission of a privacy proxy URI in response to the privacy proxy URI request, and means for establishing a privacy connection with an user equipment in response to receiving a request to connect including a URI, The URI is a portion of the privacy enabled URI based at least in part on the privacy proxy URI. The apparatus also includes means for causing the transmission of a request message to a service node in response to receiving a request message from the user equipment through the privacy connection.

In some example embodiments of the apparatus, the transmission of the privacy proxy uniform identifier is caused in response to receiving a privacy proxy uniform resource identifier request from the service node. In an example embodiment of the apparatus, the privacy enabled URI is further based on the servicing node URI. In some example embodiments, the apparatus also includes means for sending a reply message to the UE in response to receiving a reply message from the servicing node. In an example embodiment of the apparatus, the privacy connection is an onion routing protocol (Tor).

In an example embodiment of the apparatus, the request messages are received and transmitted using a constrained application protocol (CoAP). In some example embodiments, the apparatus also includes means for connecting to a privacy network in response to receiving the privacy proxy URI request.

In another example embodiment an apparatus is provided including means for receiving a privacy proxy uniform resource identifier (URI) from an anonymity proxy, means for generating a privacy enabled URI based at least in part on the privacy proxy URI, means for causing the transmission of the privacy enabled URI, and means for receiving a request message from the anonymity proxy. The anonymity proxy transmits the request message in response to receiving a request message from a user equipment based on the privacy enabled URI through a privacy connection.

In some example embodiments of the apparatus, the receiving a privacy proxy uniform resource identifier from an anonymity proxy is in response to transmitting a privacy proxy uniform resource identifier request. In an example embodiment, the apparatus also includes means for performing an action based on the request message. In some example embodiments, the apparatus also includes means for causing the transmission of a reply message. The reply message is received by the anonymity proxy which transmits the reply message to the user equipment through the privacy connection. In an example embodiment of the apparatus, the request messages or reply messages are received and transmitted using a constrained application protocol (CoAP).

BRIEF DESCRIPTION OF THE DRAWINGS

Figure 1:
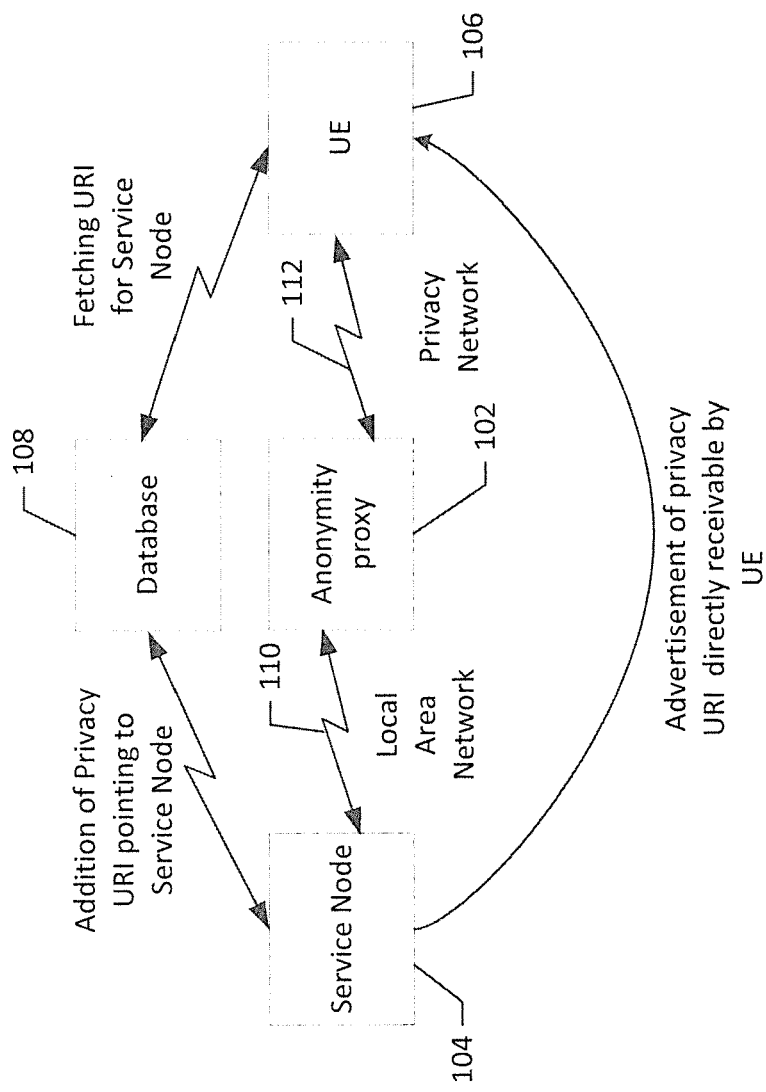
Figure 2:
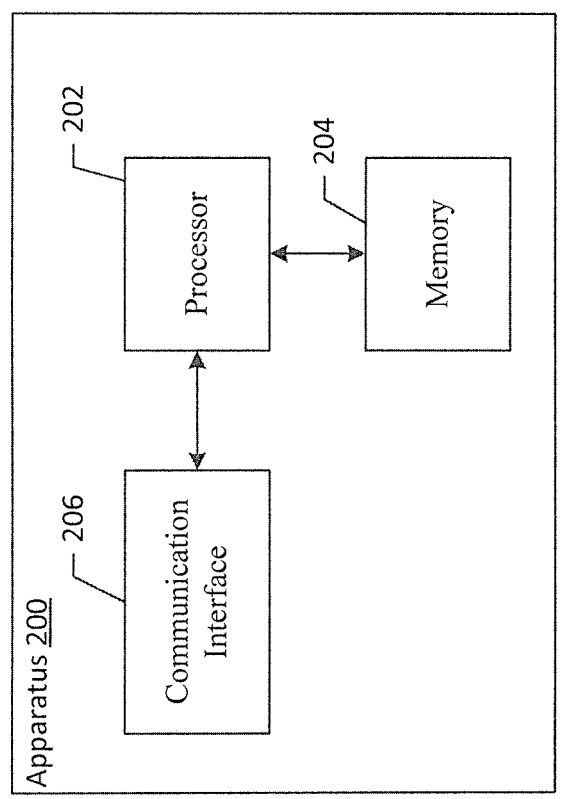
Figure 3:
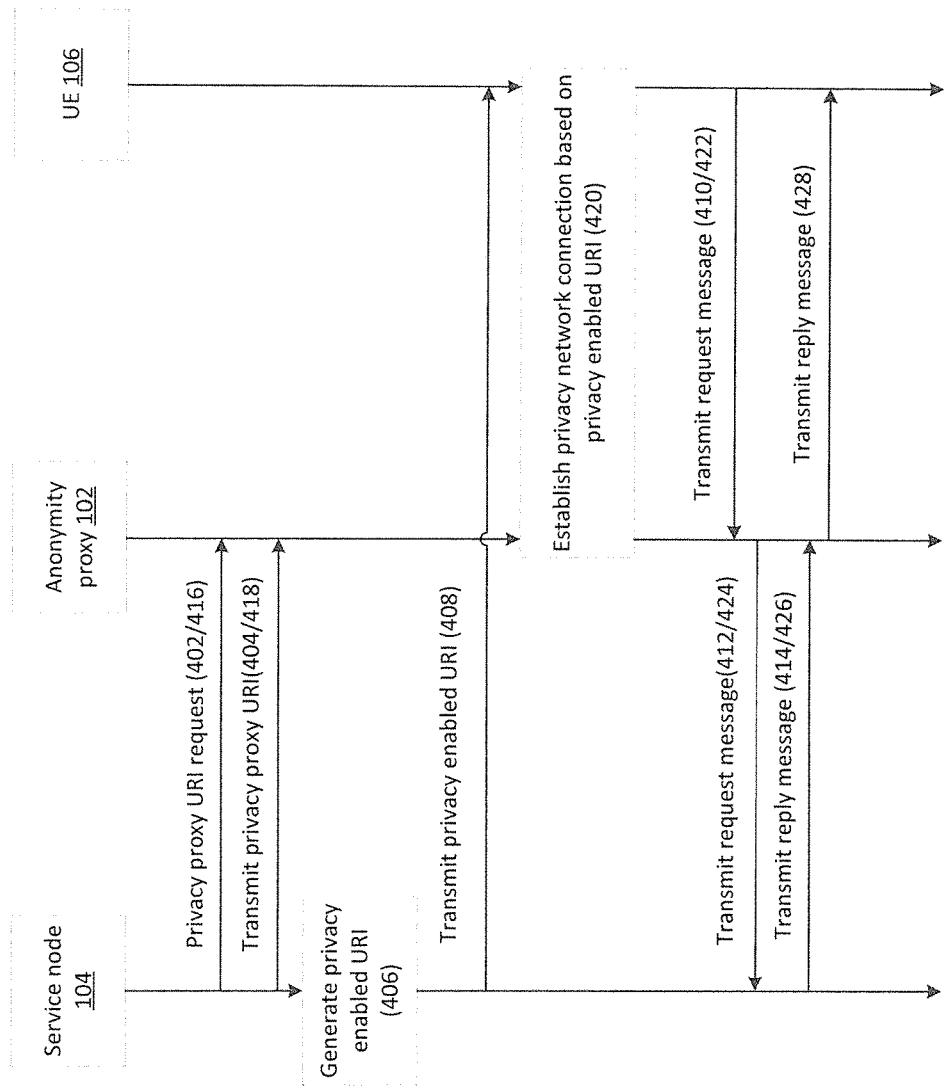

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for anonymous access and control of a service node in accordance with an example embodiment of the present invention;

FIG. 3 illustrates an example data flowchart between a service node, anonymity proxy, and user equipment in accordance with an example embodiment of the present invention; and FIGS. 4A and 4B are a flowcharts illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Significant effort has been spent on access control and authorization of use of service nodes. As the IoT grows the need for anonymous access to these service nodes has become of greater concern. Some examples of concerns may include new issues such as, network surveillance and digital payment. In other cases anonymity may be desirable if the option is available, for example accessing nodes for streetlight, traffic lights, temperature sensors, weather stations, or the like, or allowing a guest to use service nodes in a home without revealing unnecessary information, such as internet protocol (IP) address and thus internet location to the guest UEs.

In some networks anonymity may be provided for the user and UE by using onion routing (Tor). Tor networks may provide anonymity for transmission control protocol (TCP) based applications and the associated users. Tor messages are repeatedly encrypted and then sent through several network nodes called onion routers. Similar to someone peeling an onion, each onion router removes a layer of encryption to uncover routing instructions, and sends the message to the next router where this is repeated. This prevents these intermediary nodes from knowing the origin, destination, and contents of the message. Similarly for servers, Tor may enable location hidden services. Rather than revealing a server's IP address (and thus its network location), a location hidden service is accessed through its onion address. The Tor network understands these addresses and can route data to and from hidden services, even to those hosted behind firewalls or network address translators (NATs), while preserving the anonymity of both parties.

Although Tor may allow for anonymity of the user, UE, and servers it fails to provide privacy and security to the communications to and from the service node.

Constrained application protocol (CoAP) has been developed to allow for interactive communications with resource constrained internet devices, such as sensors, switches, valves, or the like. CoAP messages may traverse over user datagram protocol or datagram transport layer security. In some cases the CoAP may be configured for alternative transports including over web sockets, or TCP. Additionally, hypertext transfer protocol (HTTP)-CoAP in use with a web based proxy autodiscovery protocol (WPAP) may allow for a CoAP to utilize a HTTP proxy.

Somewhat anonymous access of a UE may be provided by hiding the identity of the user, such as anonymizing UDP socket secure (SOCKS) proxy, but the proxy may not necessarily have the trust relationship or connectivity path to the service node. Further in an instance in which the service node location is hidden, such as by using a proxy, this would also not be effective, since the UE would not be able to ascertain the URI to address the service node. Similarly, this would not be effective in contacting service nodes behind firewalls.

Service nodes are commonly resource-constrained and cannot implement heavy protocols needed for privacy solutions, for example, implementation of Tor protocol for service nodes is too resource intensive due to heavy cryptography involved in transport layer security (TLS).

However, the utilization of a protocol on the UE side of the communications, such as Tor, with a secure, for example, anonymity, proxy may enable anonymous access to the service node and maintain the anonymity of the service node.

Communications Diagram

A method, apparatus and computer program product are provided in accordance with an example embodiment for anonymous access and control of a service node. FIG. 1 illustrates a communication diagram including user equipment (UE) in data communications with an anonymity proxy 102 using a privacy network 112. The anonymity proxy 102 is in data communications with a service node 104 using a local area network (LAN) 110. The UE 106 and the service node 104 and UE 106 may be in communications with a database 108. The service node 104 may be in unilateral data communication with the UE 106.

The UE 106 may be a mobile computing device, such as a laptop computer, tablet computer, mobile phone, smart phone, navigation unit, personal data assistant, or the like. Additionally or alternatively the UE 106 may be a fixed computing device, such as a personal computer, computer workstation, kiosk, office terminal computer or system, or the like. The anonymity proxy 102 may be a mobile computing device, fixed computing device, server, or the like. The service node 104 may be a resource constrained internet communicable device, such as a sensor, switch, valve, or the like. The LAN may utilize 802.15.4, ZigBee, Bluetooth low energy, 802.11 WiFi, 802.3 wired Ethernet, power line communications, visible light communications, or the like. The database 108 may be a portion of or associated with the anonymity proxy and/or the UE 106. For example, the database 108 may be a CoAP resource directory, domain name system (DNS), a web server hosting URI collections, a cloud database, local database, or rendezvous server, or any other data map service database which could be accessed by the UE 102 and/or anonymity proxy 104 in order to find URIs located in the query location.

The service node 104 may request a privacy proxy URI for an anonymity proxy 102 using the local area network 110. The privacy proxy URI request may be a multicast or unicast CoAP message for a resource, for example, "./well-known/rd-lookup/res?=proxy-uri." An anonymity proxy 102 may receive the privacy proxy URI request from the service node 104 and provide a privacy proxy URI to the service node.

The service node 104 may receive the privacy proxy URI for one or more locally available anonymity proxies 102. The URIs may indicate different anonymity technologies used by the anonymity proxy 102, such as Tor, invisible internet project (I2P), Anoymizer, Pipenet, Hordes, or the like. An example privacy URI in an instance in which Tor protocol is used may be "coap+tor://dgwigutmhwryoagt.onion." This approach may allow the use of any anonymity technology, since the service node 104 merely receives and uses the privacy URI, leaving communication coordination to the UE 106 and anonymity proxy 102 which have the resources to make such determinations. The service node 104 may select one or more of the anonymity proxies 102. In some embodiments the selection of anonymity proxies may be based on the type of anonymity technology indicated, for example in an instance in which the anonymity protocol is specified as Tor the resource could be "tor-proxy-uri."

The service node 104 may generate a privacy supporting standard-formatted URI for itself. The standard-formatted URI may be a URI which the anonymity proxy 102 may resolve into a real IP address, but does not leak identity, for example, a local-scoped name, such as "coap://aSf324BSD.local/temp" where the "aSf324BSD.local" would be a local name. In an instance in which small leakage of private information is allowed, such as when the service node 104 is unable to obtain a name for itself, the standard-formatted URI may be a link-local IPv6 address, such as "coap://fe80::1234:2546:ab8f:fec0/temp" that would have link-local IPv6 address in it. In an example embodiment, the link-local IPv6 address may be randomly generated to prevent the information leakage about service node 104.

The service node 104 may generate a privacy enabled URI, for example, by combining the received privacy proxy URI with the standard-formatted URI. For example, the service node 104 may append the standard-formatted URI to the privacy proxy URI, such as "coap+tor://dgwigutmhwryoagt.onion/?target_uri=coap://aSf324BSD.local/temp". In some embodiments the privacy enabled URI is added to a database 108.

In an example embodiment privacy may be further improved by generating a hashed standard-formatted URI. The anonymity proxy 102 may register a Privacy URI, for example "aBsdf432B" with the service node's 104 URI "coap://aSf324BSD.local/temp". The anonymity proxy 102 may then provide a hashed URI, such as "aBsdf432B" to the anonymity proxy 104, and then the anonymity proxy may generate a combined URI of "coap+tor://dgwigutmhwryoagt.onion/?target_uri=aBsdf432B".

The service node 104 may transmit the privacy enabled URI to UEs 106 within range of the service node, for example, advertise the service nodes availability through the anonymity proxy 102 to any UE. The privacy enabled URI advertisement may be near field communication (NFC), quick response (QR) codes, Bluetooth™ low energy, or the like. Additionally or alternatively, a UE 106 may query the database 108 for available service nodes 104, and fetch the privacy enabled URI for the service node.

The UE 106 may know the service node 102 only through context, such as how the discovery of the privacy proxy URI was made, for example, search for thermostats, or device descriptors, for example, "Temp control Room 123A" or "lighting", while maintaining location privacy of the UE 106 and service node 104 in an internet topology.

The UE 106 may establish a privacy connection with the anonymity proxy 102 using the privacy enabled URI, over a privacy network, such as by using a Tor protocol. In some instances, the anonymity proxy 102 may be a location hidden service within the privacy network or Tor protocol, allowing for anonymity for both the anonymity proxy 102 and the UE 106. In an example embodiment, the anonymity proxy 102 may be a known exit point of the privacy network, allowing for anonymity of the UE 106 only.

In some example embodiments, the UE 106 may be configured to establish connections with service nodes 104 through a privacy connection only in an instance in which the advertisement announces support for anonymized access.

The UE 106 may transmit request messages inside the privacy connection, using a CoAP message to the service node 104 through the anonymity proxy 102. The request message may be a connection request, a command request, such as open, shut, or adjust a valve or switch position, or report sensor data, or the like. The anonymity proxy 102 may transmit the request messages to the service node 104 using the local area network 110. In some instances, the anonymity proxy 102 may perform name lookup functions to resolve the privacy enabled URI, such as aSf324BSD.local, into a local IP address. The anonymity proxy 102 may address and transmit a request message using the local IP address. The transmission of the request message and any subsequent reply message may traverse network address translation (NAT) tunnels of the privacy network, for example, modifying network address information IP datagram packet headers while they are in transit across a traffic routing device for the purpose of remapping one IP address space into another.

In some example embodiments, the service node 104 may perform actions based on the request message, such as opening, shutting or adjusting switch or valve positions, receiving sensor data, or the like.

The service node 104 may transmit a reply message to the UE 106 through the anonymity proxy 102. The reply message may be an indication of the action performed based on the request message, an acknowledgment of the request message, an acknowledgement of connection, or the like.

By transmitting messages through the anonymity proxy 102, the service node does not have to understand, or be capable of executing, privacy network protocols. The service node 104 may manage existing protocols, such as CoAP.

In an example embodiment, the service node 102 may discover or be connected to an anonymity proxy 104 during its bootstrapping, for example, using configuration messages by controlling devices. In some example embodiments, the service node 104 may dynamically discover presence and location of an anonymity proxy 102 and location, such as a domain name. In an example embodiment, an anonymity proxy 102 may push a privacy proxy URI to a service node instead of in response to a privacy proxy URI request.

In some embodiments, the privacy enabled URI can point to a cache device associated with service node 104. For example, the cache device may be a mirror proxy or any other kind of cache from which the UE 106 may fetch the data. In this embodiment, the anonymity proxy 102 may also act as the cache device. In an instance in which the anonymity proxy acts as cache for service node 104, the resulting privacy enabled URI could point just to a cached resource on the anonymity proxy, such as "coap+tor:// dgwigutmhwryoagt.onion/aSf324BSD/temp". In another embodiment the service node 102 may act as the cache device for an external sensor or actuator. In such an embodiment, the sensor may communicate with the cache device service node 102 and the service node 102 may implement some functions associated with anonymity proxy, such as privacy URI creation.

In this embodiment the anonymity proxy may store the resource representations of the service node 104, for example, rather that resolving for the service node address, the anonymity proxy 102 may immediately provide responses to the UE 106 from its cache.

In some embodiments, the anonymity proxy 102 connects to a privacy network in response to a service node 104 request for a privacy proxy URI. The connection duration to the privacy network may be limited, in some embodiments, for example the anonymity proxy 102 may provide a valid lifetime to the service node 104 with the privacy proxy URI. In an instance in which the service node 104 fails to reperform the privacy proxy URI request within the valid lifetime, the anonymity proxy 102 may disconnect from the privacy network.

In an instance in which the UE 106 is unable to execute a privacy protocol to establish a privacy connection with the anonymity proxy 102, the UE of an example embodiment, may send a CoAP message for the service node 104 to a privacy network connected proxy and provide the full privacy enabled URI. The privacy network connected proxy may establish a privacy connection with the anonymity proxy 102 associated with the service node 104. The CoAP message may be forwarded through the privacy network connected proxy and the anonymity proxy 102 to the service node 104. This configuration may allow for limited anonymity, due to the privacy network connected proxy may be able determine the service node 104 location and UE 106 information.

Although the example privacy network used in examples throughout this application is onion routing (Tor), it would be immediately understood by a person of ordinary skill in the art that any other anonymity network may be used. For example, an anonymity architecture could be detected by a privacy network based on the scheme of the URI, for example, coap+tor, coap+label, or authority, for example, form ".onion" suffix, or the like. Similarly, although service node communications are CoAP protocol throughout this application, one of ordinary skill in the art would immediately realize that other service node communications protocols may be used, such as message queue telemetry transport (MQTT), AllJoyn, HTTP, Extensible messaging and presence protocol (XMPP), or the like.

In an example embodiment, the anonymity proxy 102 may be in the same LAN 110 as the service node 104, making connection, discovery, and communications security relatively easy to arrange as discussed above. In an instance in which the anonymity proxy is located outside of the LAN 110, the service node must additionally be reachable by the anonymity proxy using a secure connection, such as transport layer security (TLS) or datagram transport layer security (DTLS), and the service node must have a method of locating the anonymity proxy, for example DNS query, Anycast, multicast IP addresses, or resource providing services, such as CoAP resource directory, or manual configuration.

In an example embodiment, the anonymity proxy 104 using a Tor network may be a location hidden service in the privacy network. In some example embodiments, the anonymity proxy may be an onion router. In an instance in which the anonymity proxy is an onion router, the anonymity proxy 102 may have an exit policy which limits service node protocols, for example only allowing CoAP, decreasing the volumes of unwanted protocols which may not be optimal.

In some example embodiments, the anonymity proxy 102 may not be fully trusted. In an instance in which the service node 104 and UE 106 have the capability to encrypt end-to-end payloads, risk of loss of information due to a untrustworthy anonymity proxy may be prevented.

Example Apparatus

An anonymity proxy 102 or service node 104 may include or otherwise be associated with an apparatus 200 as shown in FIG. 2. The apparatus, such as that shown in FIG. 2, is specifically configured in accordance with an example embodiment of the present invention for anonymous access and control of a service node. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by anonymity proxy 102 or service node 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 106, anonymity proxy 102, service node 104, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Example Data Flow Chart Between a Service Node and User Equipment

FIG. 3 illustrates an example data flow chart between a service node, an anonymity proxy, and user equipment in accordance with an example embodiment of the present invention. The data flow is illustrated between the service node 104, anonymity proxy 102 and the UE 106. The reference numbers for data transmissions and functions correspond to the process blocks depicted in FIGS. 4A and 4B.

At 402/416 the service node 104 may transmit a privacy proxy URI request to anonymity proxies 102 within range of the service node. At 404/418 the anonymity proxy may respond to the privacy proxy request by transmitting a privacy proxy URI.

At 406 the service node 104 may generate a privacy enabled URI by combining a standard-formatted URI associated with the service node with the privacy proxy URI.

At 408 the service node 104 may transmit the privacy enabled URI to UEs 106 within range of the transmission. The UE 106 may establish a privacy network connection with the anonymity proxy 102, at 420, based on the privacy enabled URI.

At 410/422, the UE 106 may transmit a request message, such as a CoAP message, to the anonymity proxy 102 using the privacy connection. The anonymity proxy may then transmit the request message to the service node 104 using the LAN, at 412/424.

At 414/426, the service node may transmit a reply message, such as a CoAP message, to the anonymity proxy 104, which may in turn transmit the reply message to the UE 106, at 428, using the privacy connection.

Example Process for Anonymous Access and Control of a Service Node

Referring now to FIGS. 4A and 4B, the operations performed, such as by the apparatus 200 of FIG. 2, for anonymous access and control of a service node are depicted. FIG. 4A is directed to the operations of an apparatus included in or otherwise associated with a service node, such as service node 104. FIG. 4B is directed toward the operations performed by an apparatus included or otherwise associated with an anonymity proxy, such as anonymity proxy 102.

As shown in block 402 of FIG. 4A, the apparatus 200 may include means, such as a processor 202, a communications interface 206, or the like, configured to cause the transmission of a privacy proxy URI request. The processor 202 may cause the communications interface 206 to transmit the privacy proxy URI request by issuing a unicast or multicast service node message, such as a CoAP message. The privacy proxy URI request may be transmitted over a LAN, such as LAN 110 discussed in FIG. 1.

As shown in block 404 of FIG. 4, the apparatus 200 may include means, such as a processor 202, communications interface 206, or the like, configured to receive a privacy proxy URI. The processor 202 may receive the privacy proxy URI from the communications interface 206 which in turn receives the privacy proxy URI from an anonymity proxy, such as anonymity proxy 102. In some example embodiments, the privacy proxy URI may indicate the anonymity technology used by the anonymity proxy.

In some example embodiments, the processor 202 may dynamically discover the presence and location of anonymity proxies 102, such as identifying a domain name.

As shown at block 406, of FIG. 4, the apparatus 200 may include means, such as a processor 202, memory 204, or the like, configured to generate a privacy enabled URI. The processor 202 may generate a standard-formatted URI. The standard-formatted URI is generated to be resolved into a real IP address by the anonymity proxy 102 without or with minimal identity leakage, such as a local-scoped name or lock-link IPv6 address.

The processor 202 may combine the standard-formatted URI with the privacy proxy URI to generate a privacy enabled URI. For example, the processor 202 may append the standard-formatted URI to the privacy proxy URI.

In an instance in which the anonymity proxy is acting as a cache for the apparatus 200 the privacy enable URI could point to the cache resource on the anonymity proxy 102.

In an example embodiment, the processor 202 may store the privacy enabled URI to a memory 204, such as database 108.

As shown at block 408 of FIG. 4, the apparatus 200 may include means, such as a processor 202, communications interface 206, or the like, configured to cause the transmission of a privacy enabled URI. The processor 202 may cause the communications interface 206 to transmit, for example, advertise, the privacy enabled URI using the LAN, NFC, QR codes, Bluetooth low energy, or the like. The privacy enabled URI may be received by one or more UEs 106

In an instance in which the privacy enabled URI has been stored in the database 108 a UE, such as UE 106 may request, for example, to fetch one or more privacy enabled URIs from the database 108.

As shown at block 410 of FIG. 4, the apparatus 200 may include means, such as a processor 202, a communications interface 206, or the like, configured to receive a request message from the anonymity proxy 102. The processor 202 may receive the request message from the communications interface 206, which may in turn receive the request message from the anonymity proxy 102. The anonymity proxy may receive the request message from a UE 104 as discussed below in FIG. 4B. The request message may be a connection request, a command request, such as open, shut, or adjust a valve or switch position, or report sensor data, or the like.

As shown at block 412 of FIG. 4, the apparatus 200 may include means, such as a processor 202, or the like, configured to perform an action based on the request message. The processor 202 may open, shut, or adjust a valve or switch position, or report sensor data, or generate a request acknowledgement in response to receiving the request message.

As shown at block 414 of FIG. 4, the apparatus 200 may include means, such as a processor 202, communications interface 206, or the like, configured to cause the transmission of a reply message. The processor 202 may be configured to cause the communications interface 206 to transmit a reply message to the anonymity proxy 102. The anonymity proxy 102 may transmit the reply message to the UE 102 as discussed in FIG. 4B. The reply message may be an indication of the action performed based on the request message, an acknowledgment of the request message, an acknowledgement of connection, or the like.

Referring to FIG. 4B, as shown at block 416, the apparatus 200 may include means, such as a processor 202, communications interface 206, or the like, configured to receive a privacy proxy URI request. The processor 202 may receive the privacy proxy URI request from the communications interface 206, which in turn receives the privacy proxy URI request from a service node, such as service node 104. The privacy proxy URI request may be received through the LAN as discussed in FIG. 1.

In some instances the processor 202 may cause the communications interface 206 to connect to a privacy network, such as a Tor network in response to the privacy proxy URI request.

As shown at block 418 of FIG. 4, the apparatus 200 may include means, such as a processor 202, communications interface 206, or the like, configured to cause the transmission of a privacy proxy URI. The processor 202 may cause the transmission of the privacy proxy URI in response to the privacy proxy URI request.

In some example embodiments, the processor may cause the transmission of the privacy proxy URI as a push to a service node 104, in the absence of a privacy proxy URI request.

In an example embodiment, the processor 202 may include a valid lifetime or duration for the privacy proxy URI. In an instance in which the service node 104 does not reperform the request the processor 202 may allow or cause the communications interface 206 to disconnect from a privacy network.

As shown at block 420 of FIG. 4, the apparatus 200 may include means, such as a processor 202, communications interface 206, or the like, configured to establish a privacy connection with a UE, such as UE 106. The processor 202 may cause the communications interface 206 to establish a privacy connection with the UE 106 in response to a request to connect based on a privacy enabled URI, as discussed in FIG. 1. The privacy connection may be a Tor network in which the apparatus 200 may be a location hidden service or a known exit point.

As shown at block 422 of FIG. 4, the apparatus 200 may include means, such as a processor 202, communications interface 206, or the like, configured to receive a request message. The processor 202 may receive the request message from the communications interface 206, which in turn receives the request message from a UE, such as UE 106. The request message may be a service node message, such as a CoAP message addressed using the privacy enabled URI. As described in FIG. 4A, the request message may be a connection request, a command request, such as open, shut, or adjust a valve or switch position, or request for sensor data, or the like.

As shown at block 424 of FIG. 4, the apparatus 200 may include means, such as a processor 202, communications interface 206, or the like, configured to cause the transmission of the request message. The processor 202 may perform a name lookup function to resolve a local-scoped name or link-local IPv6 address into a local IP address for the service node 104. The name look-up may be based on the privacy proxy URI of the privacy enables URI. The processor 202 may cause the communications interface 206 to transmit the request message to the service node using the local IP address.

As shown at block 426 of FIG. 4, the apparatus 200 may include means, such as a processor 202, communications interface 206, or the like, configured to receive a reply message. The processor 202 may receive the reply message from the communications interface 206, which in turn receives the reply message from the service node 104. The reply message may be a CoAP message received through the LAN as discussed in FIG. 1.

As shown at block 428 of FIG. 4, the apparatus 200 may include means, such as a processor 202, communications interface 206, or the like, configured to cause the transmission of the reply message. The processor 202 may cause the communications interface 206 to transmit the reply message to the UE 102. The communications interface 206 may transmit the response message to the UE 102 using the privacy connection as discussed in FIG. 1.

In an instance in which the apparatus 200 is acting as a cache for a service node 104, the apparatus may store resource representations in a memory 204, such as a cache. The processor may transmit reply messages to the UE 106 in response to the request message without relaying the request message. The reply message may be a CoAP message based on the resource representations stored in the cache.

The anonymity proxy allows anonymity of both the service node and the user/UE. In instances in which the anonymity proxy is a location hidden service, denial of service (DoS) attacks are mitigated since the DoS attacks do not know the IP addresses of the service nodes. This may force would be attackers to attack the privacy network instead, which is a much more difficult target.

The service node messages, such as CoAP messages, used between the service node and UE will not reveal the internet location of the UE since the IP address is that of the anonymity proxy. This is true even if the CoAP messages are not modified through the communications chain.

As described above, FIG. 4 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 402, 412, 414, and 426 in FIG. 4. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
causing the transmission of a privacy proxy uniform resource identifier;
establishing a privacy connection with a user equipment in response to receiving a request to connect including a uniform resource identifier, wherein the uniform resource identifier is a portion of a privacy enabled uniform resource identifier based at least in part on the privacy proxy uniform resource identifier; and
causing the transmission of a request message to a service node in response to receiving a request message from the user equipment through the privacy connection.

2. The method of claim 1, wherein the transmission of the privacy proxy uniform identifier is caused in response to receiving a privacy proxy uniform resource identifier request from the service node.

3. The method of claim 1, wherein the privacy enabled uniform resource identifier is further based on a uniform resource identifier of the service node.

4. The method of claim 1, further comprising:
sending a reply message to the user equipment in response to receiving a reply message from the servicing node.

5. The method of claim 1, wherein the request messages are received and transmitted using a constrained application protocol.

6. The method of claim 1, further comprising:
connecting to a privacy network in response to receiving a privacy proxy uniform resource identifier request.

7. A method comprising:
receiving a privacy proxy uniform resource identifier from an anonymity proxy;
generating a privacy enabled uniform resource identifier based at least in part on the privacy proxy uniform resource identifier;
causing the transmission of the privacy enabled uniform resource identifier; and
receiving a request message from the anonymity proxy, wherein the anonymity proxy transmits the request message in response to receiving a request message from a user equipment based at least in part on the privacy enabled uniform resource identifier through a privacy connection.

8. The method of claim 7, wherein the receiving a privacy proxy uniform resource identifier from an anonymity proxy is in response to transmitting a privacy proxy uniform resource identifier request.

9. The method of claim 7, further comprising:
causing the transmission of a reply message, wherein the reply message is received by the anonymity proxy which transmits the reply message to the user equipment through the privacy connection.

10. The method of claim 7, wherein the request messages or reply messages are received and transmitted using a constrained application protocol.

11. An apparatus comprising at least one processor and at least one memory including computer program code, the at least one memory and computer program code configured to, with the processor, cause the apparatus to at least:
cause the transmission of a privacy proxy uniform resource identifier;
establish a privacy connection with a user equipment in response to receiving a request to connect including a uniform resource identifier, wherein the uniform resource identifier is a portion of a privacy enabled uniform resource identifier based at least in part on the privacy proxy uniform resource identifier; and
cause the transmission of a request message to a service node in response to receiving a request message from the user equipment through the privacy connection.

12. The apparatus of claim 11, wherein the transmission of the privacy proxy uniform identifier is caused in response to receiving a privacy proxy uniform resource identifier request from the service node.

13. The apparatus of claim 11, wherein the privacy enabled uniform resource identifier is further based on a uniform resource identifier of the service node.

14. The apparatus of claim 11, wherein the at least one memory and the computer program code are further configured to:
send a reply message to the user equipment in response to receiving a reply message from the servicing node.

15. The apparatus of claim 11, wherein the request messages are received and transmitted using a constrained application protocol.

16. The apparatus of claim 11, wherein the at least one memory and the computer program code are further configured to:
connect to a privacy network in response to receiving a privacy proxy uniform resource identifier request.

17. An apparatus comprising at least one processor and at least one memory including computer program code, the at least one memory and computer program code configured to, with the processor, cause the apparatus to at least:
receive a privacy proxy uniform resource identifier from an anonymity proxy;
generate a privacy enabled uniform resource identifier based at least in part on the privacy proxy uniform resource identifier;
cause the transmission of the privacy enabled uniform resource identifier; and
receive a request message from the anonymity proxy, wherein the anonymity proxy transmits the request message in response to receiving a request message from a user equipment based at least in part on the privacy enabled uniform resource identifier through a privacy connection.

18. The apparatus of claim 17, wherein the receiving a privacy proxy uniform resource identifier from an anonymity proxy is in response to transmitting a privacy proxy uniform resource identifier request.

19. The apparatus of claim 17, wherein the at least one memory and the computer program code are further configured to:
cause the transmission of a reply message, wherein the reply message is received by the anonymity proxy which transmits the reply message to the user equipment through the privacy connection.

20. The apparatus of claim 17, wherein the request messages or reply messages are received and transmitted using a constrained application protocol.

21. An apparatus comprising at least one processor and at least one memory including computer program code, the at least one memory and computer program code configured to, with the processor, cause the apparatus to at least:
receive a privacy enabled uniform resource identifier comprising a privacy proxy uniform resource identifier;
establish a privacy connection with an anonymity proxy using the privacy enabled uniform resource identifier; and
transmit a request message comprising a portion of the privacy enabled uniform resource identifier based at least in part on the privacy proxy uniform resource identifier to a service node through the privacy connection.

* * * * *